United States Patent
Bassis

(10) Patent No.: US 11,655,858 B2
(45) Date of Patent: May 23, 2023

(54) HOUSING DRIVE CONNECTION FOR A CONSTANT VELOCITY JOINT

(71) Applicant: NIO Technology (Anhui) Co., Ltd., Hefei (CN)

(72) Inventor: Dimitri Bassis, Menlo Park, CA (US)

(73) Assignee: NIO TECHNOLOGY (ANHUI) CO., LTD., Hefei (CN)

( * ) Notice: Subject to any disclaimer, the term of this patent is extended or adjusted under 35 U.S.C. 154(b) by 1464 days.

(21) Appl. No.: 15/855,003

(22) Filed: Dec. 27, 2017

(65) Prior Publication Data

US 2019/0195288 A1 Jun. 27, 2019

(51) Int. Cl.
| | |
|---|---|
| F16D 3/223 | (2011.01) |
| F16D 3/34 | (2006.01) |
| F16D 1/10 | (2006.01) |
| F16B 2/20 | (2006.01) |
| F16D 3/84 | (2006.01) |

(52) U.S. Cl.
CPC .................. *F16D 3/34* (2013.01); *F16B 2/20* (2013.01); *F16D 1/10* (2013.01); *F16D 3/845* (2013.01); *F16D 2001/103* (2013.01)

(58) Field of Classification Search
CPC ...... F16C 19/364; F16C 19/548; F16D 3/845; F16D 3/843; F16D 3/84; F16D 3/227; F16D 3/223
See application file for complete search history.

(56) References Cited

U.S. PATENT DOCUMENTS

| | | | | |
|---|---|---|---|---|
| 3,469,647 A | * | 9/1969 | Brown | B60K 17/046 180/255 |
| 4,405,032 A | * | 9/1983 | Welschof | F16D 3/223 180/259 |
| 4,454,640 A | * | 6/1984 | Egusa | F16C 19/386 29/898.063 |
| 4,536,038 A | * | 8/1985 | Krude | F16D 3/845 464/178 |
| 4,540,384 A | * | 9/1985 | Bennett | F16D 3/2055 464/111 |
| 4,541,819 A | * | 9/1985 | Mazziotti | F16D 3/227 464/146 |
| 2002/0114552 A1 | * | 8/2002 | Csik | F16C 35/073 384/589 |
| 2003/0146591 A1 | * | 8/2003 | Ouchi | B21K 1/06 280/93.512 |
| 2004/0058737 A1 | * | 3/2004 | Yoshida | F16D 3/223 464/145 |
| 2005/0054453 A1 | * | 3/2005 | Kozlowski | F16D 3/845 464/173 |
| 2005/0088036 A1 | * | 4/2005 | Myers | B60B 27/00 301/105.1 |
| 2005/0143180 A1 | * | 6/2005 | Johnson | F16J 3/042 464/173 |
| 2007/0117639 A1 | * | 5/2007 | Cermak | B60B 27/00 464/178 |

(Continued)

*Primary Examiner* — Daniel J Wiley
(74) *Attorney, Agent, or Firm* — Sheridan Ross, PC

(57) ABSTRACT

A constant velocity joint for use in a vehicle and a method of mounting a constant velocity joint including a splined shaft. The constant velocity joint also includes an O-ring gland, an inner race, an outer race, rolling elements, and a boot. The splined shaft of the constant velocity joint transmits torque from a splined hub of a second rotating element.

10 Claims, 5 Drawing Sheets

(56) References Cited

U.S. PATENT DOCUMENTS

| | | | | |
|---|---|---|---|---|
| 2008/0234057 | A1* | 9/2008 | Takekawa | F16D 3/227 |
| | | | | 464/145 |
| 2009/0097792 | A1* | 4/2009 | Kamikawa | F16C 35/063 |
| | | | | 384/448 |
| 2009/0186706 | A1* | 7/2009 | Arden | F16D 7/027 |
| | | | | 464/46 |
| 2009/0208279 | A1* | 8/2009 | Cermak | F16D 3/845 |
| | | | | 403/316 |
| 2011/0009199 | A1* | 1/2011 | Yamauchi | B60B 27/0084 |
| | | | | 464/106 |
| 2012/0281941 | A1* | 11/2012 | Umekida | B60B 27/0042 |
| | | | | 384/544 |
| 2013/0172088 | A1* | 7/2013 | Umekida | B60B 27/0042 |
| | | | | 403/359.1 |
| 2013/0252746 | A1* | 9/2013 | Sugiyama | F16D 3/223 |
| | | | | 464/141 |
| 2013/0252748 | A1* | 9/2013 | Sugiyama | F16D 3/223 |
| | | | | 464/162 |
| 2014/0162796 | A1* | 6/2014 | Dine | F16D 3/223 |
| | | | | 464/173 |
| 2014/0361606 | A1* | 12/2014 | Mochinaga | F16D 1/072 |
| | | | | 301/109 |
| 2015/0204386 | A1* | 7/2015 | Yoshida | F16D 3/2237 |
| | | | | 148/320 |
| 2016/0017929 | A1* | 1/2016 | Sugiyama | F16D 1/116 |
| | | | | 464/142 |
| 2016/0159145 | A1* | 6/2016 | Nagata | B60B 27/0026 |
| | | | | 29/898.07 |
| 2017/0321758 | A1* | 11/2017 | Kato | F16D 3/2245 |

* cited by examiner

HOUSING DRIVE CONNECTION FOR A CONSTANT VELOCITY JOINT

FIELD

The present disclosure is generally directed to constant velocity joints, in particular, toward a housing drive connection for use with a constant velocity joint.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

As an example, conventional vehicles use an engine to provide power to move the wheels. Single engine vehicles require a differential and a number of half shafts to connect the engine power to the wheels. A constant velocity joint is typically used to connect the differential to the half shaft. Contemporary constant velocity joints are typically difficult to install, physically large, and physically heavy components. What is needed is a constant velocity joint that is relatively easier to install, physically smaller, and physically lighter.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
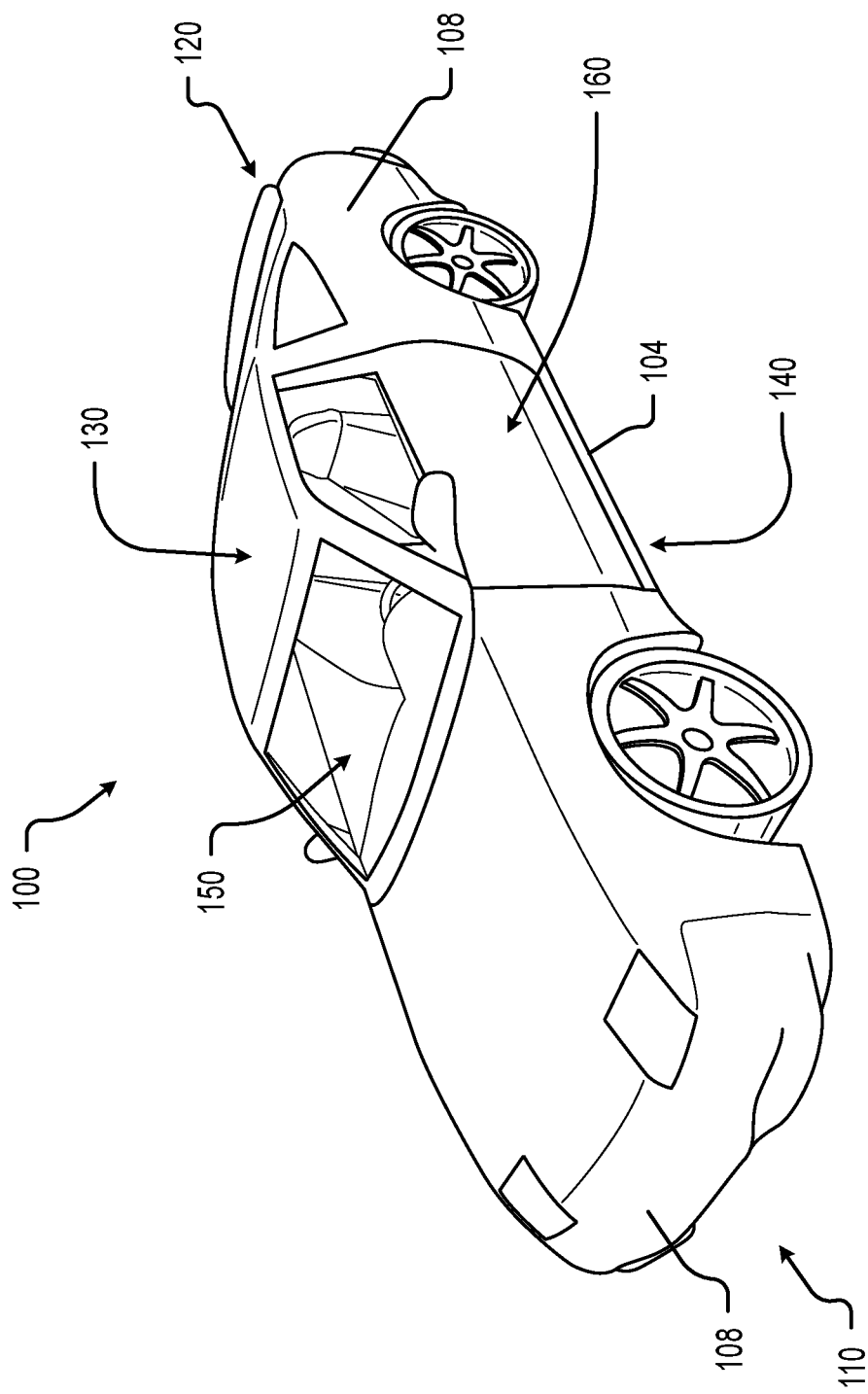
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

Figure 2:
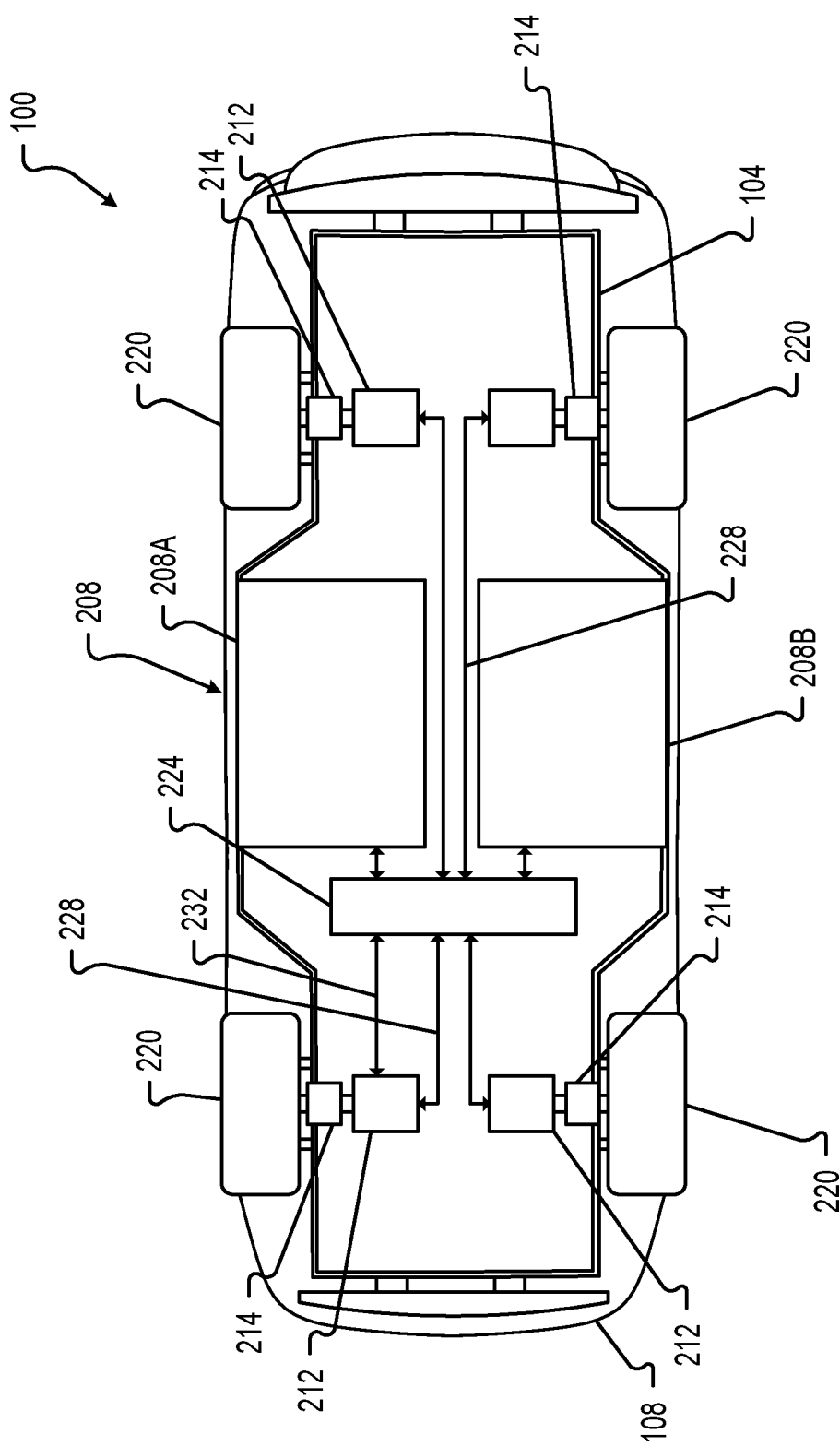
FIG. 2 shows a plan view of the vehicle in accordance with at least some embodiments of the present disclosure.

Referring now to FIG. 2, a plan view of a vehicle 100 will be described in accordance with embodiments of the present disclosure. As provided above, the vehicle 100 may comprise a number of electrical and/or mechanical systems, subsystems, etc. The mechanical systems of the vehicle 100 can include structural, power, safety, and communications subsystems, to name a few. While each subsystem may be described separately, it should be appreciated that the components of a particular subsystem may be shared between one or more other subsystems of the vehicle 100.

The structural subsystem includes the frame 104 of the vehicle 100. The frame 104 may comprise a separate frame and body construction (i.e., body-on-frame construction), a unitary frame and body construction (i.e., a unibody construction), or any other construction defining the structure of the vehicle 100. The frame 104 may be made from one or more materials including, but in no way limited to steel, titanium, aluminum, carbon fiber, plastic, polymers, etc., and/or combinations thereof. In some embodiments, the frame 104 may be formed, welded, fused, fastened, pressed, etc., combinations thereof, or otherwise shaped to define a physical structure and strength of the vehicle 100. In any event, the frame 104 may comprise one or more surfaces, connections, protrusions, cavities, mounting points, tabs, slots, or other features that are configured to receive other components that make up the vehicle 100. For example, the body panels 108, powertrain subsystem, controls systems, interior components, communications subsystem, and safety subsystem may interconnect with, or attach to, the frame 104 of the vehicle 100.

The frame 104 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allow the vehicle 100 to adapt to the ever-changing technological demands of society and advances in safety. Among other things, the mechanisms may provide for the quick exchange of batteries, capacitors, power sources 208A, 208B, motors 212, engines, safety equipment, controllers, user interfaces, interiors exterior components, body panels 108, bumpers, sensors, etc., and/or combinations thereof. Additionally or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single-minute exchange ("SME") principle. In some embodiments, the frame 104 may include slides, receptacles, cavities, protrusions, and/or a number of other features that allow for quick exchange of system components. In one embodiment, the frame 104 may include tray or ledge features, mechanical interconnection features, locking mechanisms, retaining mechanisms, etc., and/or combinations thereof. In some embodiments, it may be beneficial to quickly remove a used power source 208A, 208B (e.g., battery unit, capacitor unit, etc.) from the vehicle 100 and replace the used power source 208A, 208B with a charged or new power source. Continuing this example, the power source 208A, 208B may include selectively interchangeable features that interconnect with the frame 104 or other portion of the vehicle 100. For instance, in a power source 208A, 208B replacement, the quick release features may be configured to release the power source 208A, 208B from an engaged position and slide or move in a direction away from the frame 104 of a vehicle 100. Once removed, or separated from, the vehicle, the power source 208A, 208B may be replaced (e.g., with a new power source, a charged power source, etc.) by engaging the replacement power source into a system receiving position adjacent to the vehicle 100. In some embodiments, the vehicle 100 may include one or more actuators configured to position, lift, slide, or otherwise engage the replacement power source with the vehicle 100. In one embodiment, the replacement power source may be inserted into the vehicle 100 or vehicle frame 104 with mechanisms and/or machines that are external and/or separate from the vehicle 100.

In some embodiments, the frame 104 may include one or more features configured to selectively interconnect with other vehicles and/or portions of vehicles. These selectively interconnecting features can allow for one or more vehicles to selectively couple together and decouple for a variety of purposes. For example, it is an aspect of the present disclosure that a number of vehicles may be selectively coupled together to share energy, increase power output, provide security, decrease power consumption, provide towing services, and/or provide a range of other benefits. Continuing this example, the vehicles may be coupled together based on travel route, destination, preferences, settings, sensor information, and/or some other data. The coupling may be initiated by at least one controller of the vehicle and/or traffic control system upon determining that a coupling is beneficial to one or more vehicles in a group of vehicles or a traffic system. As can be appreciated, the power consumption for a group of vehicles traveling in a same direction may be reduced or decreased by removing any aerodynamic separation between vehicles. In this case, the vehicles may be coupled together to subject only the foremost vehicle in the coupling to air and/or wind resistance during travel. In one embodiment, the power output by the group of vehicles may be proportionally or selectively controlled to provide a specific output from each of the one or more of the vehicles in the group.

The interconnecting, or coupling, features may be configured as electromagnetic mechanisms, mechanical couplings, electromechanical coupling mechanisms, etc., and/or combinations thereof. The features may be selectively deployed from a portion of the frame 104 and/or body of the vehicle 100. In some cases, the features may be built into the frame 104 and/or body of the vehicle 100. In any event, the features may deploy from an unexposed position to an exposed position or may be configured to selectively engage/disengage without requiring an exposure or deployment of the mechanism from the frame 104 and/or body of the vehicle 100. In some embodiments, the interconnecting features may be configured to interconnect one or more of power, communications, electrical energy, fuel, and/or the like. One or more of the power, mechanical, and/or communications connections between vehicles may be part of a single interconnection mechanism. In some embodiments, the interconnection mechanism may include multiple connection mechanisms. In any event, the single interconnection mechanism or the interconnection mechanism may employ the poka-yoke features as described above.

The power system of the vehicle 100 may include the powertrain, power distribution system, accessory power system, and/or any other components that store power, provide power, convert power, and/or distribute power to one or more portions of the vehicle 100. The powertrain may include the one or more electric motors 212 of the vehicle 100. The electric motors 212 are configured to convert electrical energy provided by a power source into mechanical energy. This mechanical energy may be in the form of a rotational or other output force that is configured to propel or otherwise provide a motive force for the vehicle 100.

In some embodiments, the vehicle 100 may include one or more drive wheels 220 that are driven by the one or more electric motors 212 connected to the drive wheels 220 by constant velocity joints 214. In some cases, the vehicle 100 may include an electric motor 212 configured to provide a driving force for each drive wheel 220. In other cases, a single electric motor 212 may be configured to share an output force between two or more drive wheels 220 via one or more power transmission components. It is an aspect of the present disclosure that the powertrain may include one or more power transmission components, motor controllers, and/or power controllers that can provide a controlled output of power to one or more of the drive wheels 220 of the vehicle 100. The power transmission components, power controllers, or motor controllers may be controlled by at least one other vehicle controller or computer system as described herein.

As provided above, the powertrain of the vehicle 100 may include one or more power sources 208A, 208B. These one or more power sources 208A, 208B may be configured to provide drive power, system and/or subsystem power, accessory power, etc. While described herein as a single power source 208 for sake of clarity, embodiments of the present disclosure are not so limited. For example, it should be appreciated that independent, different, or separate power sources 208A, 208B may provide power to various systems of the vehicle 100. For instance, a drive power source may be configured to provide the power for the one or more electric motors 212 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 208A, 208B in this manner may provide a number of benefits over conventional vehicle systems. For example, separating the power sources 208A, 208B allow one power source 208 to be removed and/or replaced independently without requiring that power be removed from all systems and/or subsystems of the vehicle 100 during a power source 208 removal/replacement. For instance, one or more of the accessories, communications, safety equipment, and/or backup power systems, etc., may be maintained even when a particular power source 208A, 208B is depleted, removed, or becomes otherwise inoperable.

In some embodiments, the drive power source may be separated into two or more cells, units, sources, and/or systems. By way of example, a vehicle 100 may include a first drive power source 208A and a second drive power source 208B. The first drive power source 208A may be operated independently from or in conjunction with the second drive power source 208B and vice versa. Continuing this example, the first drive power source 208A may be removed from a vehicle while a second drive power source 208B can be maintained in the vehicle 100 to provide drive power. This approach allows the vehicle 100 to significantly reduce weight (e.g., of the first drive power source 208A, etc.) and improve power consumption, even if only for a temporary period of time. In some cases, a vehicle 100 running low on power may automatically determine that pulling over to a rest area, emergency lane, and removing, or "dropping off," at least one power source 208A, 208B may reduce enough weight of the vehicle 100 to allow the vehicle 100 to navigate to the closest power source replacement and/or charging area. In some embodiments, the removed, or "dropped off," power source 208A may be collected by a collection service, vehicle mechanic, tow truck, or even another vehicle or individual.

The power source 208 may include a GPS or other geographical location system that may be configured to emit a location signal to one or more receiving entities. For instance, the signal may be broadcast or targeted to a specific receiving party. Additionally or alternatively, the power source 208 may include a unique identifier that may be used to associate the power source 208 with a particular vehicle 100 or vehicle user. This unique identifier may allow an efficient recovery of the power source 208 dropped off. In some embodiments, the unique identifier may provide information for the particular vehicle 100 or vehicle user to be billed or charged with a cost of recovery for the power source 208.

The power source 208 may include a charge controller 224 that may be configured to determine charge levels of the power source 208, control a rate at which charge is drawn from the power source 208, control a rate at which charge is added to the power source 208, and/or monitor a health of the power source 208 (e.g., one or more cells, portions, etc.). In some embodiments, the charge controller 224 or the power source 208 may include a communication interface. The communication interface can allow the charge controller 224 to report a state of the power source 208 to one or more other controllers of the vehicle 100 or even communicate with a communication device separate and/or apart from the vehicle 100. Additionally or alternatively, the communication interface may be configured to receive instructions (e.g., control instructions, charge instructions, communication instructions, etc.) from one or more other controllers or computers of the vehicle 100 or a communication device that is separate and/or apart from the vehicle 100.

The powertrain includes one or more power distribution systems configured to transmit power from the power source 208 to one or more electric motors 212 in the vehicle 100. The power distribution system may include electrical interconnections 228 in the form of cables, wires, traces, wireless power transmission systems, etc., and/or combinations thereof. It is an aspect of the present disclosure that the vehicle 100 include one or more redundant electrical interconnections 232 of the power distribution system. The redundant electrical interconnections 232 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection 232 is being used and/or damage has occurred to a particular area of the vehicle electrical system. In any event, the one or more redundant electrical interconnections 232 may be configured along completely different routes than the electrical interconnections 228 and/or include different modes of failure than the electrical interconnections 228 to, among other things, prevent a total interruption power distribution in the event of a failure.

The vehicle 100 may include one or more safety systems. Vehicle safety systems can include a variety of mechanical and/or electrical components including, but in no way limited to, low impact or energy-absorbing bumpers, crumple zones, reinforced body panels, reinforced frame components, impact bars, power source containment zones, safety glass, seatbelts, supplemental restraint systems, air bags, escape hatches, removable access panels, impact sensors, accelerometers, vision systems, radar systems, etc., and/or the like. In some embodiments, the one or more of the safety components may include a safety sensor or group of safety sensors associated with the one or more of the safety components. For example, a crumple zone may include one or more strain gages, impact sensors, pressure transducers, etc. These sensors may be configured to detect or determine whether a portion of the vehicle 100 has been subjected to a particular force, deformation, or other impact. Once detected, the information collected by the sensors may be transmitted or sent to one or more of a controller of the vehicle 100 (e.g., a safety controller, vehicle controller, etc.) or a communication device associated with the vehicle 100 (e.g., across a communication network, etc.).

As discussed above, each wheel may be driven by a motor connected to the wheel via a constant velocity joint. Traditionally, constant velocity joints operate to connect a differential to a wheel. Traditional constant velocity joints come with unfortunate attributes such as massive physical size, as a half shaft may be required, and a great deal of weight. With electric vehicles, however, the need for a differential may be eliminated as each wheel may be driven by a separate motor. As such, as discussed herein, a constant velocity joint has been developed with a reduced weight and size.

An issue with contemporary constant velocity joints addressed with the present disclosure is the balance of adequately securing the outer race to an output of a gear box with limiting the outer radial size of the constant velocity joint to a relative minimum. Some contemporary designs use bolts which require a flange design along the outer edge of the outer race. Such a flange design necessarily increases the size of the constant velocity joint. These bolts may increase the diameter of the constant velocity joint by 10 mm or more.

Figure 3:
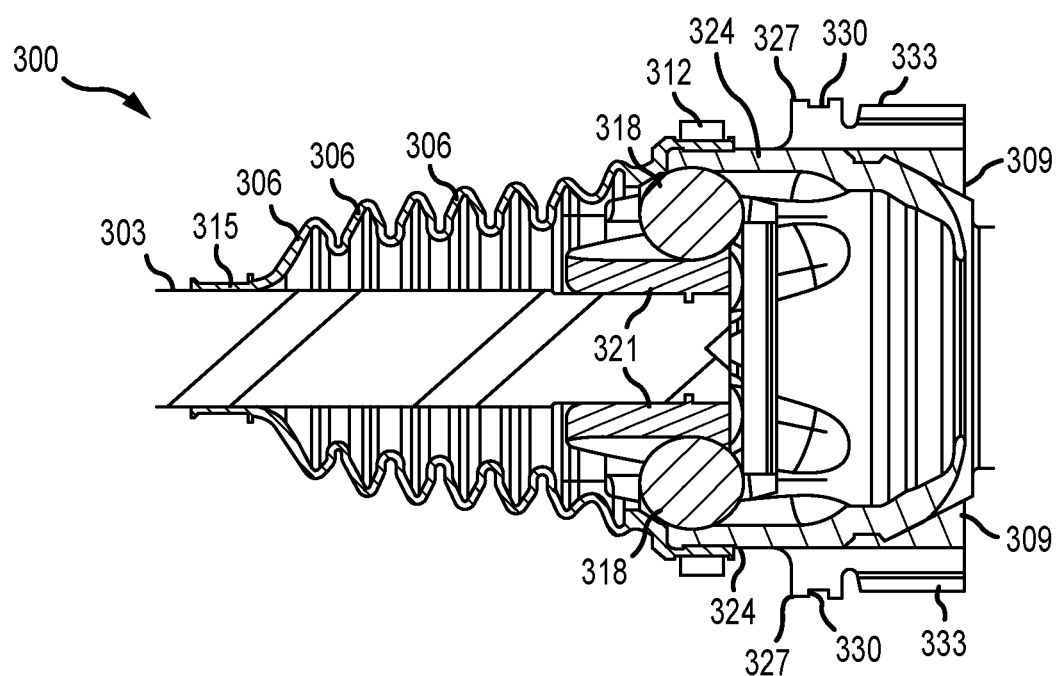
FIG. 3 shows an embodiment of a constant velocity joint according to one embodiment of the present disclosure.

FIG. 3 shows an exemplary unmounted constant velocity joint 300 in accordance with embodiments of the disclosure. The constant velocity joint 300 may comprise a constant velocity joint body 309 and an outer race 324. The body 309 and outer race 324 may operate to revolve in relation to a drive shaft 303 inserted into the constant velocity joint 300. A constant velocity boot 306 or cover may be mounted onto the body 309 of the constant velocity joint 300 and allow for the drive shaft 303 to spin while keeping dust, dirt, and other foreign substances from entering the constant velocity joint 300.

The constant velocity joint 300 may comprise an outer race 324 and an inner race 321 arranged such that a plurality of balls or rolling elements 318 are held between the outer race 324 and inner race 321.

To keep dust, debris, dirt, etc., out of the constant velocity joint 300, a boot 306 may be fitted over the inner race 321. The boot 306 may be clamped onto the constant velocity joint body 309 via a band clamp 312 and a boot clamp 315.

The constant velocity joint body 309 may comprise an O-ring gland or groove 330.

The O-ring gland 330 may be sized such that an O-ring may be placed into the O-ring gland 330. The O-ring may be such that after the constant velocity joint is mounted, the O-ring seals a joint to keep grease and/or lubricant inside the constant velocity joint.

The constant velocity joint 300 may also comprise a mounting clip interface 327. The mounting clip interface 327 may allow for a clip of a planetary carrier or gear box housing, etc. to contact a mounted constant velocity joint 300 and prevent the mounted constant velocity joint 300 from slipping out of the planetary carrier or gear box housing or other element into which the constant velocity joint is mounted.

The constant velocity joint 300 may also comprise a spline 333. As disclosed herein, by using a spline design to attach the outer race of the constant velocity joint, the entire constant velocity joint can fit within a smaller space as compared to contemporary constant velocity joints. As disclosed herein, a spline may take care of the torque and applies the force of the planetary gear box to the CV joint/half shaft. In some embodiments, the spline may be an involute spline with a self-centering effect.

The spline of the outer race may comprise a series of parallel keys formed integrally with the shaft.

The spline of the outer race may be designed such that the outer race forms a splined shaft capable of mating with corresponding grooves cut in a planetary carrier, shaft, gear stage, or other output of a gear box. In this way, the outer race of the constant velocity joint may couple with a gear box output and be capable of handling heavy torques without slippage.

In some embodiments, the spline may have straight-sided teeth. In some embodiments, the spline may comprise teeth of involute profile. In some embodiments, the spline may comprise a self-centering effect. In some embodiments, the spline may be designed under the American National Standard ANSI B92.1 (1993) which is hereby incorporated by reference. Teeth of the spline of the constant velocity joint may comprise one or more of a flat root or a rounded fillet root.

Figure 4:
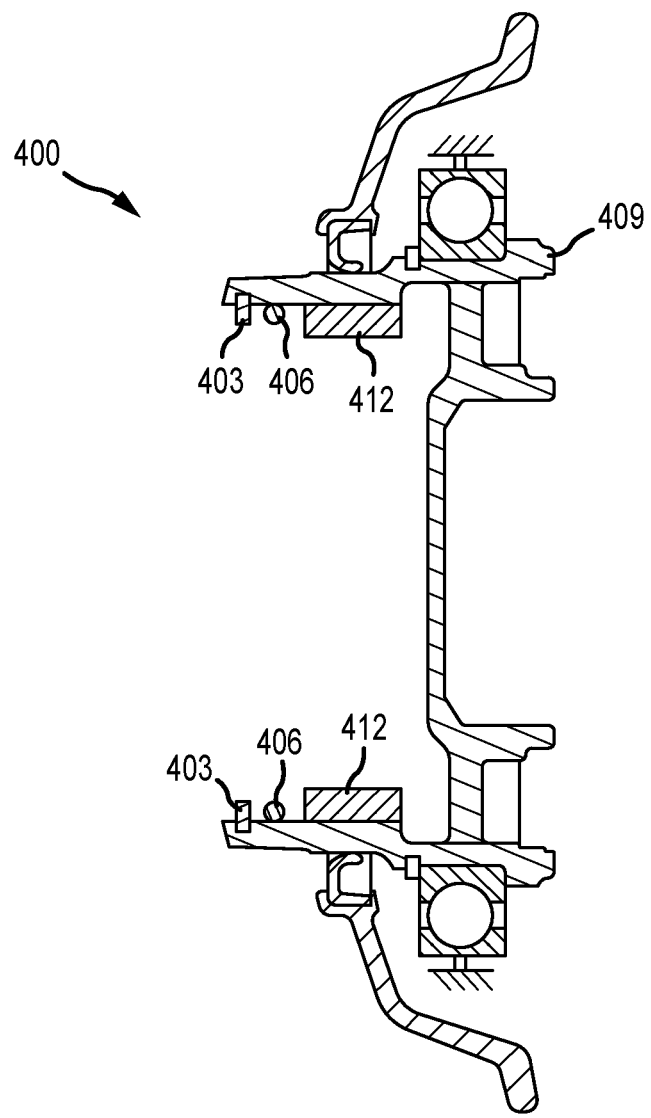
FIG. 4 shows an embodiment of a planetary carrier according to one embodiment of the present disclosure.

As illustrated in FIG. 4, a planetary carrier 400 of a gearbox may in some embodiments comprise a race 409. The race 409 of the planetary carrier 400 may be used to apply rotational force from a gear box of a vehicle to a constant velocity joint. The race 409 may comprise a splined coupling 412 or hub with an internal spline. The coupling 412 may be such that it may couple with a splined shaft of a constant velocity joint as discussed above.

The planetary carrier 400 may further comprise an O-ring gland or groove 406. The O-ring gland 406 may be sized such that an O-ring may be placed into the O-ring gland 406. The O-ring may be such that when a constant velocity joint is mounted into the planetary carrier, the O-ring seals a joint to keep grease and/or lubricant inside the constant velocity joint.

The planetary carrier 400 may further comprise a clip 403. The clip 403 may be flexible plastic or other material. The clip 403 may be such that when a constant velocity joint as described above is inserted into the planetary carrier 400, the clip 403 will flex inward until the constant velocity joint is fully inserted into the planetary carrier 400, at which point the clip 403 may return to its normal position and hold the constant velocity joint in the planetary carrier 400.

While a planetary carrier is illustrated in the figures, the disclosure is not so limited. The constant velocity joint as described herein may be any shaft, end, gear stage, output shaft of gear box, or other element.

Figure 5:
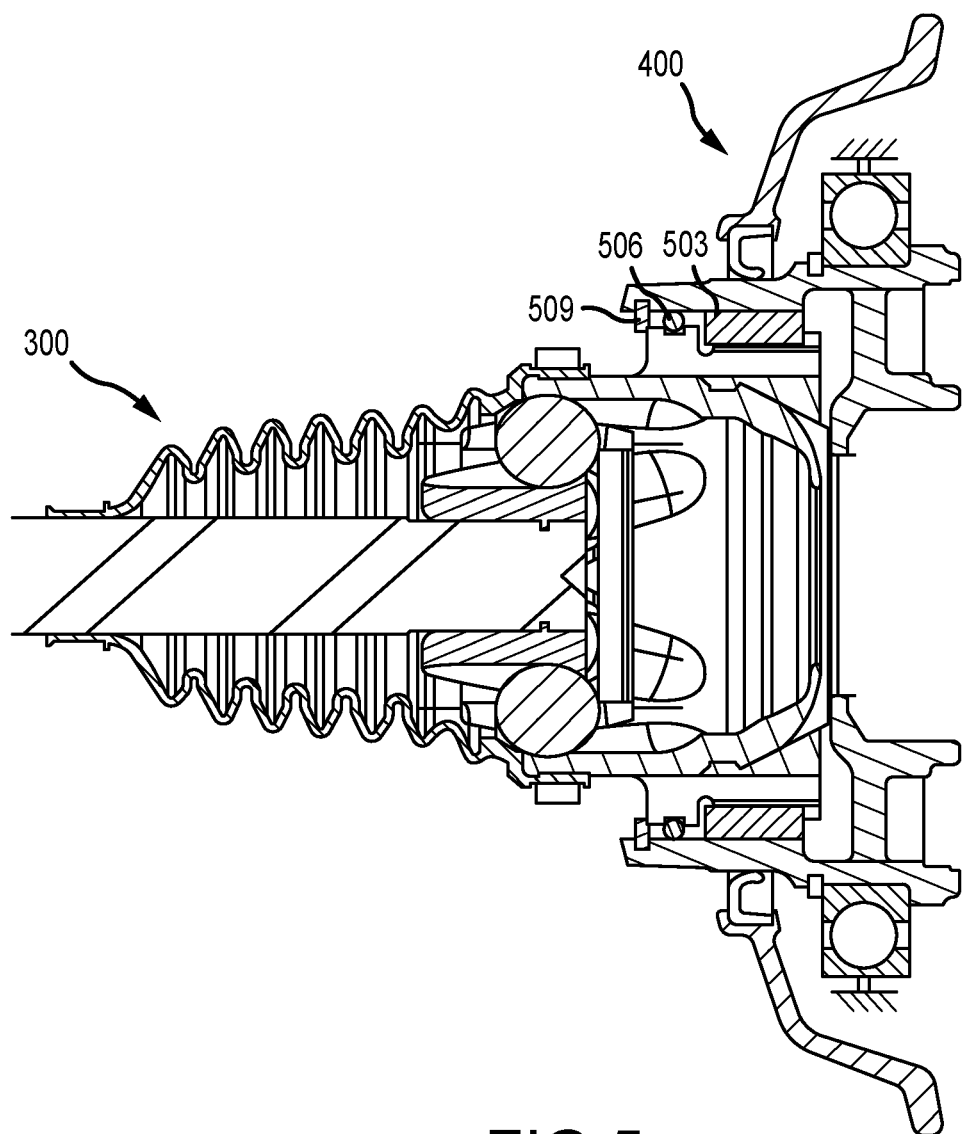
FIG. 5 shows an embodiment of a constant velocity joint according to one embodiment of the present disclosure.

FIG. 5 illustrates a constant velocity joint 300 mounted into a planetary carrier 400. As can be appreciated, when the constant velocity joint 300 is mounted into the planetary carrier 400, the splined shaft of the constant velocity joint 300 slides into the splined coupling of the planetary carrier 503. The coupling of the splined shaft and the splined coupling may provide a self-centering effect. Prior to mounting the constant velocity joint 300, an O-ring 506 may be placed onto one of the constant velocity joint O-ring hub or the O-ring hub of the planetary carrier. As the constant velocity joint is slid into the planetary carrier, the O-ring may provide a seal. In some embodiments, a grease or lubricant may be applied to the splined shaft prior to mounting the constant velocity joint into the planetary carrier. A clip 509 may be used to prevent the constant velocity joint from slipping out of the planetary carrier.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a joint assembly for use in a vehicle, the assembly comprising: an inner member; an outer member; a splined shaft, the splined shaft connected to the outer member, wherein the spline is capable of applying torque originating from a gear box of the vehicle to the outer member.

Aspects of the above joint assembly include wherein the splined shaft comprises an involute spline.

Aspects of the above joint assembly include wherein the splined shaft is capable of generating a self-centering effect.

Aspects of the above joint assembly include wherein the assembly connects directly with a gearbox.

Aspects of the above joint assembly include wherein the inner member connects directly with a wheel.

Aspects of the above joint assembly include wherein the outer member comprises a clip interface.

Aspects of the above joint assembly include wherein the clip interface is capable of making contact with a clip, wherein the clip holds the joint assembly in place.

Aspects of the above joint assembly include the assembly further comprising an O-ring gland.

Aspects of the above joint assembly include wherein the splined shaft fits within a splined hub of a planetary carrier.

Aspects of the above joint assembly include wherein the splined shaft defines an outer diameter of the assembly.

Embodiments include a method of mounting a constant velocity joint, the method comprising: applying a lubricant to a splined shaft connected to an outer race of the constant velocity joint; applying an O-ring to an O-ring gland of the outer race of the constant velocity joint; and fitting the splined shaft into a splined hub of a planetary carrier.

Aspects of the above method include wherein the splined shaft comprises an involute spline.

Aspects of the above method include wherein the splined shaft is capable of generating a self-centering effect.

Aspects of the above method include wherein the splined shaft receives torque from the splined hub of the planetary carrier.

Aspects of the above method include wherein an inner race of the constant velocity joint connects directly with a wheel.

Aspects of the above method include wherein the outer race of the constant velocity joint comprises a clip interface.

Aspects of the above method include wherein the clip interface is capable of making contact with a clip, wherein the clip holds the joint assembly in place.

Aspects of the above method include wherein the constant velocity joint comprises a boot covering an inner race of the constant velocity joint.

Aspects of the above method include wherein the O-ring fits within an O-ring gland of the planetary carrier.

Aspects of the above method include wherein the splined shaft defines an outer diameter of the assembly.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A joint assembly for use in a vehicle, the joint assembly comprising:
    an inner race;
    an outer race comprising a clip interface at a first outer portion of the outer race, wherein the clip interface is capable of making contact with a clip to hold the joint assembly in place;
    a splined shaft including a splined portion at a second outer portion of the outer race, wherein the splined shaft is capable of applying torque originating from a gear box of the vehicle to the outer race; and
    an O-ring gland at a third outer portion of the outer race, wherein the third outer portion is located on the outer race between the first outer portion and the second outer portion.

2. The joint assembly of claim 1, wherein the splined shaft comprises an involute spline.

3. The joint assembly of claim 2, wherein the splined shaft generates a self-centering effect.

4. The joint assembly of claim 1, wherein the joint assembly connects directly with a gearbox.

5. The joint assembly of claim 1, wherein the inner race connects directly with drive shaft.

6. The joint assembly of claim 1, further comprising an O-ring that fits into the O-ring gland to create a seal between the outer race and a planetary carrier.

7. The joint assembly of claim 1, wherein the splined shaft fits within a splined hub of a planetary carrier.

8. The joint assembly of claim 1, wherein the splined shaft defines an outer diameter of the joint assembly.

9. A vehicle comprising a joint assembly, the joint assembly comprising:
    an inner race;
    an outer race comprising a clip interface at a first outer portion of the outer race, wherein the clip interface is capable of making contact with a clip to hold the joint assembly in place;
    a splined shaft including a splined portion at a second outer portion of the outer race, wherein the splined shaft is capable of applying torque originating from a gear box of the vehicle to the outer race; and
    an O-ring gland at a third outer portion of the outer race, wherein the third outer portion is located on the outer race between the first outer portion and the second outer portion.

10. The vehicle of claim 9, wherein the splined shaft comprises an involute spline.

* * * * *